(12) United States Patent  
Peng et al.

(10) Patent No.: US 10,392,128 B2  
(45) Date of Patent: Aug. 27, 2019

(54) ROTORCRAFT AND AUTOMATIC LANDING SYSTEM AND METHOD THEREOF

(71) Applicant: GUANGZHOU XAIRCRAFT TECHNOLOGY CO., LTD., Guangzhou (CN)

(72) Inventors: Bin Peng, Guangzhou (CN); Yousheng Chen, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 448 days.

(21) Appl. No.: 15/431,079

(22) Filed: Feb. 13, 2017

(65) Prior Publication Data  
US 2017/0152059 A1   Jun. 1, 2017

Related U.S. Application Data

(63) Continuation of application No. PCT/CN2015/091752, filed on Oct. 12, 2015.

(30) Foreign Application Priority Data

Oct. 27, 2014  (CN) .......................... 2014 1 0588409

(51) Int. Cl.  
*B64D 45/08* (2006.01)  
*B64D 47/08* (2006.01)  
(Continued)

(52) U.S. Cl.  
CPC .............. *B64D 45/08* (2013.01); *B64C 27/08* (2013.01); *B64C 27/12* (2013.01); *B64C 39/024* (2013.01);  
(Continued)

(58) Field of Classification Search  
CPC .......... B64C 2201/024; B64C 2201/18; B64C 27/08; B64C 27/12; B64C 39/024; B64D 31/00; B64D 45/08; B64D 47/08  
See application file for complete search history.

(56) References Cited

U.S. PATENT DOCUMENTS 5,235,513 A * 8/1993 Velger ....................... G01S 1/70  
 244/183  
7,010,401 B1 * 3/2006 Richburg ............. G05D 1/0225  
 180/167  
(Continued)

FOREIGN PATENT DOCUMENTS

CN  101762273 A  6/2010  
CN  101976078 A  2/2011  
(Continued)

OTHER PUBLICATIONS

SIPO, Second Office Action for CN Application No. 201410588409, dated May 20, 2016.  
(Continued)

*Primary Examiner* — Charles J Han  
(74) *Attorney, Agent, or Firm* — Hodgson Russ LLP

(57) ABSTRACT

A rotorcraft and an automatic landing system and method thereof are provided in the present disclosure. The automatic landing system of the rotorcraft includes a controller, a laser emitter, a camera, an electronic governor and a motor configured to drive a propeller of the rotorcraft to rotate. The laser emitter and the camera are both locate in a bottom portion of an airframe of the rotorcraft. The laser emitter has two emission heads, laser beams emitted from the two emission heads respectively are symmetrical about a central axis, the central axis is perpendicular to a horizontal plane of a ground, and an angle between each laser beam and the central axis is an acute angle. Simply with an operation of the laser emitter, the camera and the controller, the flight  
(Continued)

speed and displacement of the rotorcraft can be controlled to realize automatic landing in the present disclosure.

20 Claims, 3 Drawing Sheets

(51) Int. Cl.
  *B64C 27/08* (2006.01)
  *B64C 39/02* (2006.01)
  *B64C 27/12* (2006.01)
  *B64D 31/00* (2006.01)
(52) U.S. Cl.
  CPC ............ *B64D 31/00* (2013.01); *B64D 47/08* (2013.01); *B64C 2201/024* (2013.01); *B64C 2201/18* (2013.01)

(56) References Cited

U.S. PATENT DOCUMENTS

| | | | | |
|---|---|---|---|---|
| 7,373,242 B2* | 5/2008 | Yamane | ................ | G01C 11/00 340/947 |
| 8,918,234 B2* | 12/2014 | Covington | ................ | G08G 5/02 701/3 |
| 8,976,340 B2* | 3/2015 | Gilliland | ................ | G01S 17/107 356/5.01 |
| 2012/0173053 A1* | 7/2012 | Ohtomo | ................ | G01C 11/04 701/4 |
| 2017/0236400 A1 | 8/2017 | Liu | | |

FOREIGN PATENT DOCUMENTS

| | | |
|---|---|---|
| CN | 102591353 A | 7/2012 |
| CN | 102756808 | 10/2012 |
| JP | H0483106 | 3/1992 |
| JP | 2012071645 | 4/2012 |
| WO | 2013145164 | 10/2013 |

OTHER PUBLICATIONS

JPO, First Office Action for JP Application No. 2017531942, dated Jan. 25, 2018.
ISA/CN, International Search Report for PCT/CN2015/091752, dated Jan. 22, 2015.

* cited by examiner

```
┌─────────────────────────────────────────────────────────────┐  S10
│ a camera shoots a landing target image and a distance image of the │
│ projections on the ground created by the laser beams emitted from the │
│ first emission head and the second emission head respectively │
└─────────────────────────────────────────────────────────────┘
                              │
                              ▼
┌─────────────────────────────────────────────────────────────┐  S20
│ reading and analyzing the landing target image and the distance image so │
│ as to obtain a real-time image datum, obtaining a spatial distance between │
│ a current position of the rotorcraft and the landing target pattern │
│ according to the predetermined angle and the real-time image data │
│ corresponding to the landing target image and the distance image │
└─────────────────────────────────────────────────────────────┘
                              │
                              ▼
┌─────────────────────────────────────────────────────────────┐  S30
│ controlling the electronic governor according to the spatial distance so as │
│ to control a rotating speed of the motor to make the rotorcraft land on the │
│ landing target pattern │
└─────────────────────────────────────────────────────────────┘
```

Fig. 3

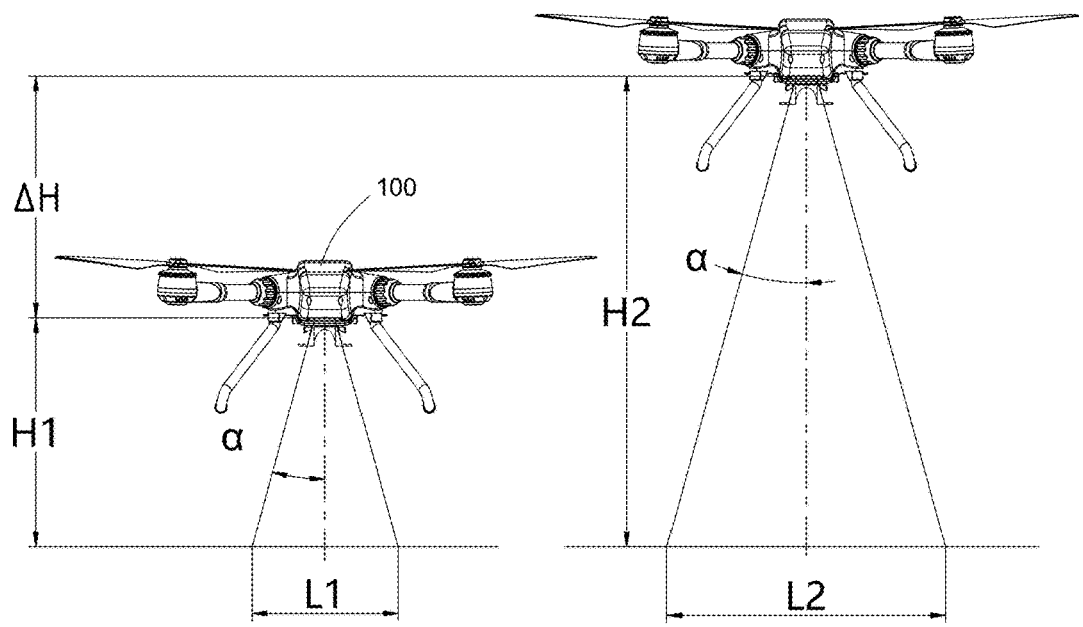

Fig. 4

ROTORCRAFT AND AUTOMATIC LANDING SYSTEM AND METHOD THEREOF

CROSS-REFERENCE TO RELATED APPLICATION

The present application is a continuation of International Patent Application No. PCT/CN2015/091752, filed Oct. 12, 2015, which claims the benefit of prior Chinese Application No. 201410588409.X filed Oct. 27, 2014. The entire contents of the above-mentioned patent applications are incorporated by reference as part of the disclosure of this U.S. application.

FIELD

The present disclosure relates to a field of aircraft technology, especially to an automatic landing system of a rotorcraft, a rotorcraft having the automatic landing system and an automatic landing method of a rotorcraft.

BACKGROUND

The quad rotorcraft has a multivariable, strongly coupled, complex and nonlinear system. Due to moving in a three dimensional space, it is more difficult to control its flight attitude and movement track than a robot on the ground. Limited by the limited load capacity and power supply, the compact rotorcraft senses the external environment by means of an airborne portable sensor system (such as a vision sensor, a compact laser range finder). In the meanwhile, an onboard control panel has a limited operational capability, through which operations on complex vision and control algorithm are difficult to perform, so it is a very challenging issue regarding how to sense the external environment according to the onboard compact sensor system, and how to program and control the movement track of the compact rotorcraft to realize an autonomous flight.

SUMMARY

The present disclosure seeks to solve one of the technical problems above to at least some extent. Thus, a first objective of the present disclosure is aimed at providing an automatic landing system of a rotorcraft, which achieves an automatic and accurate landing of the rotorcraft to a predetermined position.

A second objective of the present disclosure is aimed at providing an automatic landing method of a rotorcraft. A third objective of the present disclosure is aimed at providing a rotorcraft.

In order to achieve the first purpose above, technical proposals adopted in the present disclosure are as follows.

The automatic landing system of the rotorcraft includes a controller, a laser emitter, a camera, an electronic governor and a motor configured to drive a propeller of the rotorcraft to rotate; the laser emitter and the camera are both located in a bottom portion of the airframe of the rotorcraft; the laser emitter has two emission heads, laser beams emitted from the two emission heads respectively are symmetrical about a central axis of an airframe, the central axis is perpendicular to the horizontal plane of the ground, an angle between each laser beam and the central axis is an acute angle;

the camera is configured to obtain a landing target image and a distance image of projections created by the two laser beams on the ground;

the controller is configured to analyze real-time image data of the obtained landing target image and the distance image, calculate a current flight speed of the rotorcraft and a spatial distance between a current position of the rotorcraft and a landing target pattern according to the angle between the laser beam and the central axis, the real-time image data of the distance image and the landing target image, and the flight time, and output corresponding controlling signals to the electronic governor according to a calculation so as to make the electronic governor to control a rotational speed of the motor so that the rotorcraft is controlled to land on the landing target pattern.

In some embodiments of the present disclosure, the laser emitter is an infrared laser emitter.

In some embodiments of the present disclosure, the motor is a DC brushless motor.

In order to achieve the second purpose above, technical proposals adopted in the present disclosure are as follows.

The automatic landing method of the rotorcraft is adopted in the automatic landing system of the rotorcraft described in the present disclosure, which includes steps:

the camera obtains a distance image of the projections created by the two laser beams on the ground in real time;

the controller calculates a current flight speed of the rotorcraft according to the angle between the laser beam and the central axis, the real-time distance image and the flight time, calculates a spatial distance between a current position of the rotorcraft and the landing target pattern according to the angle between the laser beam and the central axis, real-time image data of the real-time distance image and the landing target image as well as the flight time when the camera obtains the landing target image, and outputs corresponding controlling signals to the electronic governor according to a calculation;

the electronic governor controls the rotational speed of the motor according to the controlling signals so as to control the rotorcraft to land on the landing target pattern.

The present disclosure has the following beneficial effects.

Simply with an operation of the laser emitter, the camera and the controller, the flight speed and displacement of the rotorcraft can be controlled to realize automatic landing, without mounting components such as a GPS module, a laser range finder and etc.

In order to achieve the objectives above, an automatic landing system of a rotorcraft provided in embodiments of the first aspect of the present disclosure includes: a motor configured to drive a propeller of the rotorcraft to rotate; an electronic governor connected with the motor to regulate a rotational speed of the motor; a laser emitter having a first emission head and a second emission head, in which laser beams emitted from the first emission head and the second emission head respectively are symmetrical about a central axis of an airframe, the central axis is perpendicular to a horizontal plane of a ground, a predetermined angle is formed between the laser beam and the central axis, and projections are created on the ground by the laser beams emitted from the first emission head and the second emission head respectively; a photographic device disposed at a bottom portion of the airframe of the rotorcraft and configured to shoot a landing target image and a distance image of the projections; and a controller configured to read and analyze the landing target image and the distance image so as to obtain real-time image data, obtain a spatial distance between a current position of the rotorcraft and the landing target pattern according to the predetermined angle and the real-time image data corresponding to the landing target image and the distance image, and control the electronic governor according to the spatial distance so as to make the rotorcraft land on the landing target pattern.

With the automatic landing system of the rotorcraft according to embodiments of the present disclosure, the photographic device shoots the landing target image and the distance image of the projections created by the laser beams emitted from the first emission head and the second emission head respectively on the ground, then the controller reads and analyzes the landing target image and the distance image so as to obtain the real-time image data, obtains the spatial distance between the current position of the rotorcraft and the landing target pattern according to the predetermined angle and the real-time image data corresponding to the landing target image and the distance image, and controls the electronic governor according to the spatial distance so as to make the rotorcraft land on the landing target pattern, thus achieving that the rotorcraft lands on the predetermined position automatically, without adopting components such as a GPS module, a laser range finder and etc. According to an embodiment of the present disclosure, the spatial distance includes a height of the rotorcraft and a plane coordinate of the rotorcraft with respect to the landing target pattern, the controller calculates the height of the rotorcraft according to the predetermined angle and the real-time image data corresponding to the distance image and calculates the plane coordinate of the rotorcraft with respect to the landing target pattern according to the real-time image data corresponding to the landing target image and the distance image.

When the controller recognizes the landing target pattern according to the real-time image data corresponding to the landing target image, the controller controls the electronic governor to keep a current height of the rotorcraft unchanged, and controls the electronic governor according to the plane coordinate of the rotorcraft with respect to the landing target pattern so as to make the rotorcraft to move to a position right above of the landing target pattern.

In addition, when the rotorcraft moves to the position right above the landing target pattern, the controller controls the electronic governor according to the current height of the rotorcraft so as to make the rotorcraft land on the landing target pattern.

In some embodiments of the present disclosure, the predetermined angle is an acute angle.

In another embodiment of the present disclosure, the laser emitter is an infrared laser emitter.

In another embodiment of the present disclosure, the motor is a DC brushless motor.

In another embodiment of the present disclosure, the photographic device is disposed at a central position of the bottom portion of the airframe.

In another embodiment of the present disclosure, the landing target pattern is configured to have at least one combination of an outer circle and an inner rectangle having a same center.

In another embodiment of the present disclosure, the laser emitter may be disposed at the bottom portion of the airframe.

According to another embodiment of the present disclosure, the first emission head and the second emission head of the laser emitter are disposed on terminal ends of two symmetric arms of the rotorcraft respectively.

In addition, a rotorcraft is further provided in embodiments of the present disclosure, which includes the automatic landing system above.

The rotorcraft of embodiments of the present disclosure can achieve automatic landing without adopting components such as a GPS module, a laser range finder and etc.

In order to achieve the objectives above, an automatic landing method of a rotorcraft is provided in embodiments of the second aspect of the present disclosure, in which an automatic landing system of the rotorcraft includes a motor configured to drive a propeller of the rotorcraft to rotate, an electronic governor connected with the motor, a laser emitter and a photographic device, the photographic device is disposed at a bottom portion of an airframe of the rotorcraft, a laser emitter has a first emission head and a second emission head, laser beams emitted from the first emission head and the second emission head respectively are symmetrical about a central axis of the airframe, in which the central axis is perpendicular to a horizontal plane of a ground, a predetermined angle is formed between each laser beam and the central axis, and projections are created on the ground by the laser beams emitted from the first emission head and the second emission head respectively, the method includes steps: shooting a landing target image and a distance image of the projections by means of the photographic device; reading and analyzing the landing target image and the distance image so as to obtain a real-time image data, obtaining a spatial distance between a current position of the rotorcraft and a landing target pattern according to the predetermined angle and the real-time image data corresponding to the landing target image and the distance image; and controlling the electronic governor according to the spatial distance so as to control a rotational speed of the motor to make the rotorcraft to land on the landing target pattern.

With the automatic landing method of the rotorcraft according to embodiments of the present disclosure, through the photographic device shooting the landing target image and the distance image of the projections created by the laser beams emitted from the first emission head and the second emission head respectively on the ground, then reading and analyzing the landing target image and the distance image so as to obtain the real-time image data, obtaining the spatial distance between the current position of the rotorcraft and the landing target pattern according to the predetermined angle and the real-time image data corresponding to the landing target image and the distance image, and controlling the electronic governor according to the spatial distance so as to make the rotorcraft land on the landing target pattern, the rotorcraft landing on the predetermined position automatically can be achieved, without adopting components such as a GPS module, a laser range finder and etc.

According to another embodiment of the present disclosure, the spatial distance includes a height of the rotorcraft and a plane coordinate of the rotorcraft with respect to the landing target pattern, in which the height of the rotorcraft is calculated out according to the predetermined angle and the real-time image data corresponding to the distance image, and the plane coordinate of the rotorcraft with respect to the landing target pattern is calculated out according to the real-time image data corresponding to the landing target image and the distance image.

According to another embodiment of the present disclosure, when the landing target pattern is recognized according to the real-time image data corresponding to the landing target image, a current height of the rotorcraft is kept unchanged by controlling the electronic governor, the electronic governor is controlled according to the plane coordinate of the rotorcraft with respect to the landing target pattern so as to make the rotorcraft to move to a position right above of the landing target pattern; when the rotorcraft moves to the position right above the landing target pattern, the electronic governor is controlled according to the current height of the rotorcraft so as to make the rotorcraft land on the landing target pattern.

In another embodiment of the present disclosure, the predetermined angle is an acute angle.

BRIEF DESCRIPTION OF THE DRAWINGS

FIG. 3 is flow diagram of an automatic landing method of a rotorcraft according to an embodiment of the present disclosure;

FIG. 4 is a schematic view showing a height change of a rotorcraft having an automatic landing system according to a better embodiment of the present disclosure.

Figure 1:
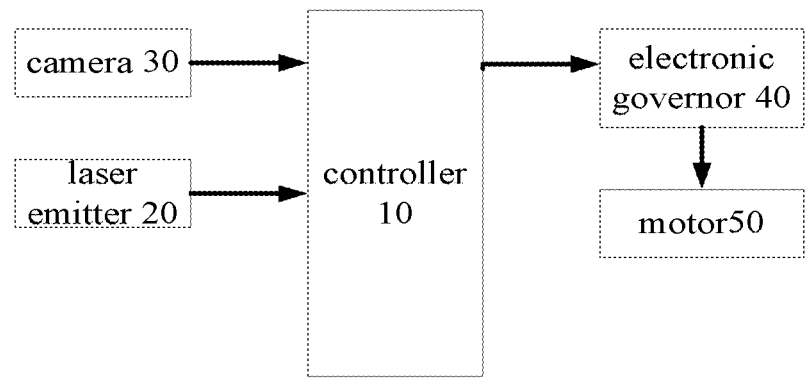
FIG. 1 is a schematic diagram of a principle of an automatic landing system of a rotorcraft according to a better embodiment of the present disclosure.

REFERENCE NUMERALS rotorcraft 100; controller 10; laser emitter 20; camera 30; electronic governor 40; motor 50.

DETAILED DESCRIPTION

Embodiments of the present disclosure will be described in detail in the following. Examples of the embodiments are shown in the drawings, and the same or similar elements and the elements having same or similar functions are denoted by like reference numerals throughout the descriptions. The embodiments described with reference to the drawings are illustrative, which is only used to explain the present disclosure and shouldn't be construed to limit the present disclosure.

An automatic landing system of a rotorcraft, a rotorcraft having the automatic landing system, and an automatic landing method of the rotorcraft provided in the embodiments of the present disclosure will be described with reference to the drawings in the following.

As shown in FIG. 1, the automatic landing system of the rotorcraft provided in an embodiment of the present disclosure includes a controller 10, a laser emitter 20, a photographic device such as a camera 30, an electronic governor 40 and a motor 50 configured to drive a propeller of the rotorcraft to rotate.

The electronic governor 40 is connected with the motor 50 to regulate a rotational speed of the motor 50, the laser emitter 20 and the photographic device such as the camera 30 may be both located at a bottom portion of an airframe of the rotorcraft. The laser emitter 20 has two emission heads i.e. a first emission head and a second emission head, laser beams emitted from the two emission heads i.e. the first emission head and the second emission head respectively are symmetrical about a central axis of the airframe, in which the central axis is perpendicular to the horizontal plane of the ground, an predetermined angle is formed between each laser beam and the central axis, and in addition, the predetermined angle may be an acute angle. That is, the angle α formed between the laser beam and the central axis is an acute angle. Projections are created on the ground by the laser beams emitted from the first emission head and the second emission head respectively.

In other embodiments of the present disclosure, there can be other configurations for the laser emitter 20, for example the first emission head and the second emission head of the laser emitter may be disposed to terminal ends of two symmetric arms of the rotorcraft respectively.

The photographic device such as the camera 30 is configured to shoot a landing target image and a distance image of the projections, the controller 10 is configured to read and analyze the landing target image and the distance image so as to obtain real-time image data, obtain a spatial distance between a current position of the rotorcraft and the landing target pattern according to the predetermined angle and the real-time image data corresponding to the landing target image and the distance image, and control the electronic governor according to the spatial distance so as to land the rotorcraft on the landing target pattern.

The camera 30 is configured to shoot the landing target image and the distance image of the projections of the two laser beams on the ground, i.e. two spots are formed when the two laser beams irradiates onto the ground, the distance image is obtained when the camera 30 shoots the two light spots, after that, the controller can calculate out a distance between the two spots. The landing target image is used to judge a relative coordinate value of x and y on a horizontal plane, and the distance image of the projections on the ground formed by the laser beams is used to judge a value of the height H of the rotorcraft. The controller 10 is configured to read and analyze the obtained real-time image data of the landing target image and the distance image, calculate a current flight speed of the rotorcraft and the spatial distance between the current position of the rotorcraft and the landing target pattern according to the angle α between the laser beam and the central axis, the real-time image data corresponding to the real-time distance image and the landing target image, and the flight time, and output corresponding controlling signals to the electronic governor according to a calculation so as to make the electronic governor control a rotational speed of the motor so that a flight speed and displacement of the rotorcraft is controlled, and thus controlling the rotorcraft to land on the landing target pattern. The angle α is stored in the controller in advance and used for a calculation and judgment of the controller.

In an embodiment of the present disclosure, the laser emitter may be an infrared laser emitter, the motor may be a DC brushless motor, and the rotorcrafts may be a quad rotorcraft, in which four propellers are provided, four motors are provided and one motor drives one propeller correspondingly.

The spatial distance includes a height of the rotorcraft and a plane coordinate of the rotorcraft with respect to the landing target pattern. The controller 10 calculates the height H of the rotorcraft according to the predetermined angle and the real-time image data corresponding to the distance image, and calculates the plane coordinate (x, y) of the rotorcraft with respect to the landing target pattern according to the real-time image data corresponding to the landing target image and the distance image. In addition, when the controller 10 recognizes the landing target pattern according to the real-time image data corresponding to the landing target image, the controller controls the electronic governor to keep a current height of the rotorcraft unchanged, as well as controls the electronic governor according to the plane coordinate of the rotorcraft with respect to the landing target pattern so as to make the rotorcraft move to a position right above the landing target pattern. When the rotorcraft moves to the position right above the landing target pattern, the controller 10 controls the electronic governor according to the current height of the rotorcraft so as to land the rotorcraft on the landing target pattern.

That is, when a symbol on the ground i.e. the landing target pattern is recognized, the rotorcraft keeps the current height and moves to the position right above the landing target pattern. When the rotorcraft arrives at the position right above a center of the landing target pattern, the rotorcraft is controlled to land at a predetermined speed, in the meanwhile the rotorcraft is controlled to adjust its position in real time according to a horizontal deviation so that the rotorcraft is kept right above the landing target i.e. the landing target pattern all the time until landing on the position of the landing target pattern.

The control algorithm adopted in the automatic landing system of the rotorcraft of embodiments of the present disclosure may be the common PID (Proportion Integration Differentiation) control algorithm, in which the control of the automatic landing of the rotorcraft is divided into a horizontal position control and a vertical height control. The horizontal position control can keep the rotorcraft right above the landing target i.e. the landing target pattern, and the vertical height control means controlling the height of the rotorcraft away from the landing target on the ground and a vertical landing speed, so that the rotorcraft lands on the position of the landing target pattern accurately and stably.

The photographic device such as the camera may be disposed at a central position of the bottom portion of the airframe, that is, the rotorcraft can be located at the center (x0, y0) of the landing target pattern at any moment. Assuming that the position (x1, y1) of the landing target image is recognized, if the central position of the landing target image is not coincident with the recognized position of the target, the rotorcraft is not right above the landing target pattern on the ground and the position thereof needs adjusting. (err_x, err_y) is an error between the center of the rotorcraft and the ground landing target in the image, based on which a PWM (Pulse Width Modulation) signal used to control the motor is calculated out by means of the PID algorithm, the controller 10 drives the motor to change the rotational speed by sending the PWM signal to the electronic governor, so that the rotorcraft moves toward a certain direction. The vertical height control is divided into a height control and a speed control. The current flight height of the rotorcraft is mainly judged in the height control, when the rotorcraft lands on the ground target, the motor of the rotorcraft is stopped. The rotorcraft is controlled to fall at a predetermined speed in the speed control, which is also adopted with the PID control algorithm.

Figure 2:
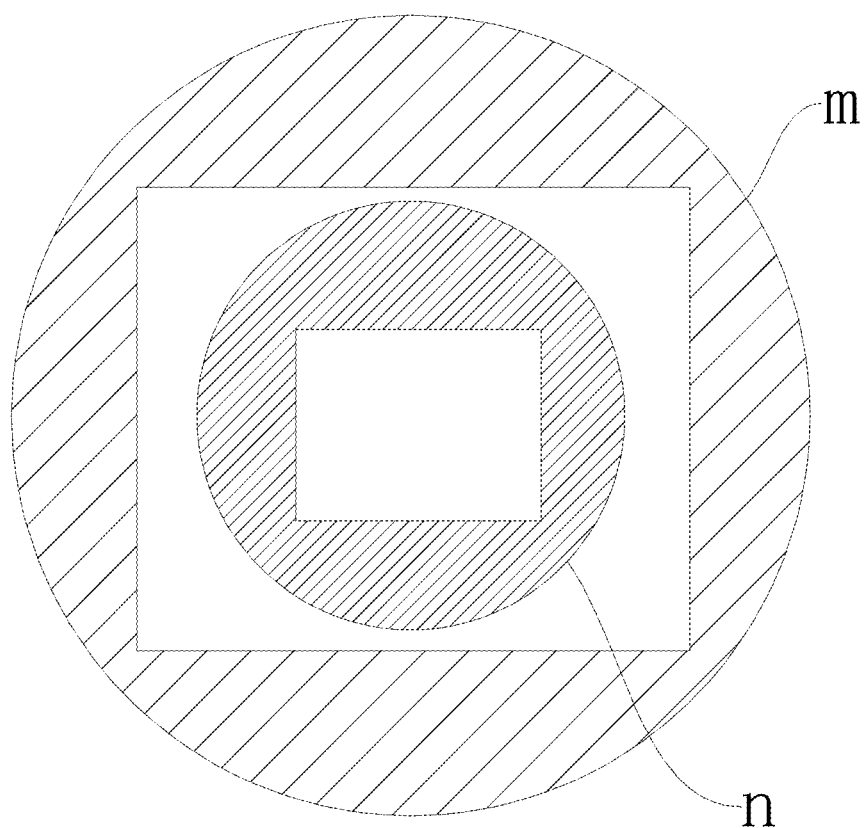
FIG. 2 is a schematic view of a landing target pattern according to an embodiment of the present disclosure.

The landing target pattern may be preset, for example an pattern round outside and rectangle inside, in which there is a smaller pattern round outside and rectangle inside, the smaller pattern is used in the landing in a close distance, because the smaller pattern round outside and rectangle inside is still in a photographic range of the camera to serve for recognizing, as shown in FIG. 2.

This is, according to an embodiment of the present disclosure, the landing target pattern is configured to have at least one combination of an outer circle and an inner rectangle having a same center. As shown in FIG. 2, the landing target pattern has two combinations of outer circles and inner rectangles having a same center, namely the larger pattern round outside and rectangle inside m and the smaller pattern round outside and rectangle inside n, the image is configured to have a pattern in which a circle cases a rectangle inside i.e. the larger pattern round outside and rectangle inside m, and meanwhile there is a smaller and same pattern n in the rectangle. The purpose of this kind of design is to enable the image to be seen both in a far distance and a close distance. The camera recognizes the larger circle and rectangle outside in the far distance and the smaller circle and rectangle in the close distance.

The camera shoots the real-time image firstly, and then the Hough transform algorithm can be used to recognize the circle in the image and detect the rectangle inside of the recognized circle. If the rectangle is detected and an area ratio of the circle to the rectangle conforms to a ratio of the predetermined image as well as the center of the circle is coincident with that of the rectangle, the circle and the rectangle are confirmed as the target to land.

With the automatic landing system of the rotorcraft according to embodiments of the present disclosure, the photographic device such as the camera shoots the landing target image and the distance image of the projections on the ground created by the laser beams emitted from the first emission head and the second emission head respectively, then the controller reads and analyzes the landing target image and the distance image so as to obtain the real-time image data, obtains the spatial distance between the current position of the rotorcraft and the landing target pattern according to the predetermined angle and the real-time image data corresponding to the landing target image and the distance image, and controls the electronic governor according to the spatial distance so as to make the rotorcraft land on the landing target pattern, thus achieving that the rotorcraft lands on the predetermined position automatically, without adopting components such as a GPS module, a laser range finder and etc.

In addition, a rotorcraft is further provided in embodiments of the present disclosure, which includes the automatic landing system above.

The rotorcraft of embodiments of the present disclosure can achieve the automatic landing effect without adopting components such as a GPS module, a laser range finder and etc.

Finally, an automatic landing method of a rotorcraft is provided in embodiments of the present disclosure, and the automatic landing method of the rotorcraft can be applied to an automatic landing system of the rotorcraft. The automatic landing system of the rotorcraft includes a motor configured to drive a propeller of the rotorcraft to rotate, an electronic governor connected with the motor, a laser emitter and a photographic device, the photographic device is disposed at a bottom portion of an airframe of the rotorcraft, a laser emitter has a first emission head and a second emission head, laser beams emitted from the first emission head and the second emission head respectively are symmetrical about a central axis of the airframe, in which the central axis is perpendicular to a horizontal plane of the ground, a predetermined angle is formed between each laser beam and the central axis, and projections are created on the ground by the laser beams emitted from the first emission head and the second emission head respectively. As shown in FIG. 3, the automatic landing method of the rotorcraft includes steps as follows.

S10: The photographic device, such as a camera, shoots a landing target image and a distance image of the projections on the ground created by the laser beams emitted from the first emission head and the second emission head respectively.

In the implement, a landing target pattern can have at least one combination of an outer circle and an inner rectangle having a same center. As shown in FIG. 2, in the embodiment of present disclosure, the landing target image has two combinations of outer circles and inner rectangles having a same center, namely the larger pattern round outside and rectangle inside image m and the smaller pattern round outside and rectangle inside image n, the image is configured to have a pattern in which a circle cases a rectangle inside i.e. the larger pattern round outside and rectangle inside image m, and meanwhile there is a smaller pattern and same image n in the rectangle.

S20: Real-time image data is obtained by reading and analyzing the landing target image and the distance image, and a spatial distance between a current position of the rotorcraft and the landing target pattern is obtained according to the predetermined angle and the real-time image data corresponding to the landing target image and the distance image.

The predetermined angle may be an acute angle α, as shown in FIG. 4.

S30: The electronic governor is controlled according to the spatial distance so as to control a rotational speed of the motor to make the rotorcraft land on the landing target pattern.

According to an embodiment of the present disclosure, the spatial distance includes a height of the rotorcraft and a plane coordinate of the rotorcraft with respect to the landing target pattern, in which the height of the rotorcraft is calculated out according to the predetermined angle and the real-time image data corresponding to the distance image, and the plane coordinate of the rotorcraft with respect to the landing target pattern is calculated out according to the real-time image data corresponding to the landing target image and the distance image.

When the landing target pattern is recognized according to the real-time image data corresponding to the landing target image, the electronic governor is controlled to keep a current height of the rotorcraft unchanged, and the electronic governor is controlled to make the rotorcraft move to a position right above the landing target pattern according to the plane coordinate of the rotorcraft with respect to the landing target pattern. When the rotorcraft moves to the position right above the landing target pattern, the electronic governor is controlled to land the rotorcraft on the landing target pattern according to the current height of the rotorcraft.

With the automatic landing method of the rotorcraft according to embodiments of the present disclosure, through the photographic device shooting the landing target image and the distance image of the projections on the ground created by the laser beams emitted from the first emission head and the second emission head respectively, then reading and analyzing the landing target image and the distance image so as to obtain the real-time image data, obtaining the spatial distance between the current position of the rotorcraft and the landing target image according to the predetermined angle and the real-time image data corresponding to the landing target pattern and the distance image, and controlling the electronic governor according to the spatial distance so as to make the rotorcraft land on the landing target pattern, the rotorcraft landing on the predetermined position automatically can be achieved, without adopting components such as a GPS module, a laser range finder and etc. In addition, the automatic landing method, which is simple, reliable and easy to achieve, doesn't need a complicated control algorithm.

The automatic landing method of the rotorcraft according to embodiments of the present disclosure is applied to the automatic landing system of the rotorcraft described in embodiments of the present disclosure, and includes steps:

Step 1: the camera obtains the distance image of projections on the ground created by the two laser beams;

Step 2: the controller calculates a current flight speed (including a lifting speed and a horizontal displacement speed) of the rotorcraft according to the angle α between the laser beam and the central axis, the real-time distance image and the flight time, calculates a current flight speed of the rotorcraft and the spatial distance between the current position of the rotorcraft and the landing target pattern according to the angle α between the laser beam and the central axis, the real-time image data corresponding to the real-time distance image and the landing target image, and the flight time, and output corresponding controlling signals to the electronic governor according to a calculation;

Step 3: the electronic governor controls a rotational speed of the motor so that the rotorcraft is controlled to land on the landing target pattern.

Figure 5:
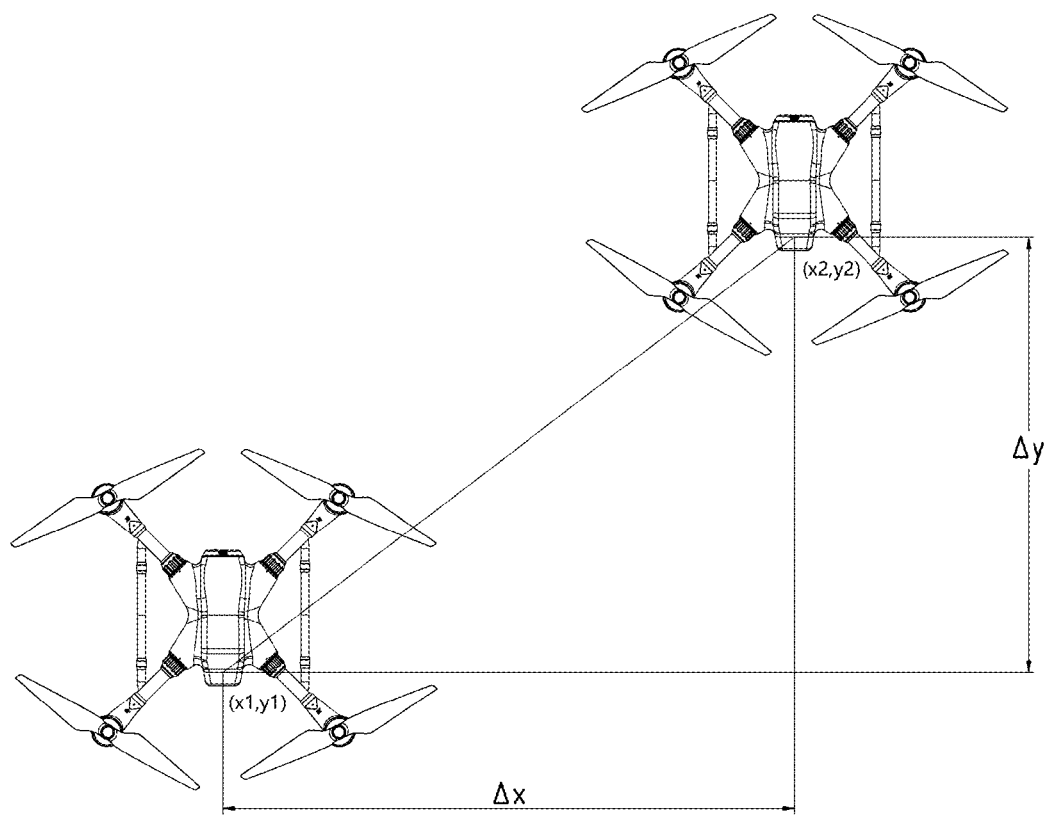
FIG. 5 is a schematic view showing a horizontal displacement change of a rotorcraft having an automatic landing system according to a better embodiment of the present disclosure.

As shown in FIG. 4 and FIG. 5, the principle of calculation of the flight speed and the spatial distance in the present disclosure is as follows:

The angle α between the laser beam and the central axis is unchanged when the rotorcraft 100 flies at different heights, but the distance between the projections created by the two laser beams on the ground changes along with the heights, the changing distance can be obtained in real time by the camera. For example, when the rotorcraft 100 is at a position A (x1, y1) in the horizontal direction, a corresponding flight height H1=L1/2 tan α and the flight time is T1. When the rotorcraft 100 flies to a position B (x2, y2), the flight time is T2 and the flight height H2=L2/2 tan α. A time difference between the position A and the position B is $\Delta T=T2-T1$, a height difference is $\Delta H=H2-H1$, and the horizontal displacement difference ($\Delta x$, $\Delta y$) during the two flight times can be obtained by the camera. The horizontal position data obtaining through the camera is known to those skilled in the related art, which will not be described here. A current flight speed V can be calculated by $V=\{\Delta H/\Delta T, \Delta x/\Delta T, \Delta y/\Delta T\}$.

When a position C is the position of the landing target pattern, the camera obtains the distance image of the two spots on the ground irradiated from the laser emitter and the landing target image, then the spatial distance between the current position of the rotorcraft and the position C, including the height $H_n$ and the horizontal distance ($x_n$, $y_n$), in which Hn may be H1, H2, H3 and etc., and ($x_n$, $y_n$) is position data at different time such as (x1,y1), (x2,y2), (x3,y3) and etc., and the current speed $V=\{\Delta H/\Delta T, \Delta x/\Delta T, \Delta y/\Delta T\}$ is also known. When the flight position information and the flight speed information of the rotorcraft are obtained, in order to arrive at the targeted landing position, the controller calculates out the error value, outputs different PWM values to the electronic governor based on the PID algorithm, and controls the rotational speed of the motor so as to arrive at the target position at the predetermined displacement and speed. The PID algorithm is a mature algorithm in the prior art, which will not be repeated here.

In the specification, it should be understood that terms such as "center", "longitudinal", "lateral", "length", "width", "depth", "up", "down", "front", "rear", "left", "right", "vertical", "horizontal", "top", "bottom", "inner", "outer", "clockwise", "counterclockwise", "axial direction", "radial direction", "circumferential direction" should be construed to refer to the orientation as then described or as shown in the drawings under discussion. These relative terms are for convenience of description and do not require that the present disclosure be constructed or operated in a particular orientation, so shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, it should be noted that, unless specified or limited otherwise, the terms "mounted," "connected," "coupled," "fixed" should be understood broadly, and may be, for example, fixed connections, detachable connections, or integral connections; may also be mechanical or electrical connections; may also be direct connections or indirect connections via intervening structures; may also be inner communications or interaction relationships of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples. In addition, the different embodiments or examples as well as the features in the different embodiments or examples described in the specification can be combined or united by those skilled in the related art in the absence of contradictory circumstances.

Although embodiments of the present disclosure have been shown and described, it would be appreciated that the embodiments above are illustrative and cannot be construed to limit the present disclosure, changes, alternatives, variation and modifications can be made to the embodiments by those skilled in the art within the scope of the present disclosure.

What is claimed is:

1. An automatic landing system of a rotorcraft, comprising:
   a motor configured to drive a propeller of the rotorcraft to rotate;
   an electronic governor communicatively connected with the motor and configured to regulate a rotational speed of the motor;
   a laser emitter having a first emission head and a second emission head, wherein the first emission head and the second emission head respectively emit laser beams symmetrically about a central axis of the airframe of the rotorcraft, wherein the central axis is perpendicular to a horizontal plane of the ground at the location of a landing pattern, wherein a predetermined angle is formed between each laser beam and the central axis, and wherein the laser beams emitted from the first emission head and the second emission head respectively create projections on the ground;
   a photographic device disposed at a bottom portion of the airframe of the rotorcraft, wherein the photographic device is configured to photograph a landing target image and a distance image of the projections; and
   a controller configured to read and analyze the landing target image and the distance image so as to obtain real-time image data, identify a landing target pattern according to the real-time image data corresponding to the landing target image, obtain a spatial distance between a current position of the rotorcraft and the landing target pattern according to the predetermined angle and the real-time image data corresponding to the landing target image and the distance image, and control the electronic governor according to the spatial distance so as to make the rotorcraft land on the landing target pattern.

2. The automatic landing system according to claim 1, wherein the spatial distance comprises an elevation of the rotorcraft and a plane coordinate of the rotorcraft with respect to the landing target pattern,
   wherein the controller calculates the elevation of the rotorcraft according to the predetermined angle and the real-time image data corresponding to the distance image, and calculates the plane coordinate of the rotorcraft with respect to the landing target pattern according to the real-time image data corresponding to the landing target image and the distance image.

3. The automatic landing system according to claim 2, wherein when the controller identifies the landing target pattern according to the real-time image data corresponding to the landing target image, and wherein the controller controls the electronic governor according to the plane coordinate of the rotorcraft with respect to the landing target pattern so as to maintain a current elevation of the rotorcraft while moving the rotorcraft to a position right above the landing target pattern.

4. The automatic landing system according to claim 3, wherein when the rotorcraft moves to the position right above the landing target pattern, the controller controls the electronic governor according to the current elevation of the rotorcraft so as to make the rotorcraft land on the landing target pattern.

5. The automatic landing method according to claim 4, wherein the predetermined angle is configured to be an acute angle.

6. The automatic landing system according to claim 3, wherein the predetermined angle is configured to be an acute angle.

7. The automatic landing system according to claim 2, wherein the predetermined angle is configured to be an acute angle.

8. The automatic landing system according to claim 1, wherein the predetermined angle is configured to be an acute angle.

9. The automatic landing system according to claim 8, wherein the laser emitter is configured to be an infrared laser emitter.

10. The automatic landing system according to claim 8, wherein the motor is configured to be a DC brushless motor.

11. The automatic landing system according to claim 8, wherein the photographic device is disposed at a central position of the bottom portion of the airframe.

12. The automatic landing system according to claim 1, wherein the laser emitter is disposed at the bottom portion of the airframe.

13. The automatic landing system according to claim 1, wherein the first emission head and the second emission head of the laser emitter are disposed to terminal ends of two symmetric arms of the rotorcraft respectively.

14. A rotorcraft, comprising an automatic landing system, wherein the automatic landing system comprises:
  a motor configured to drive a propeller of the rotorcraft to rotate;
  an electronic governor communicatively connected with the motor and configured to regulate a rotational speed of the motor;
  a laser emitter having a first emission head and a second emission head, wherein the first emission head and the second emission head respectively emit laser beams symmetrically about a central axis of the airframe of the rotorcraft, wherein the central axis is perpendicular to a horizontal plane of the ground at the location of a landing pattern, wherein a predetermined angle is formed between each laser beam and the central axis, and wherein the laser beams emitted from the first emission head and the second emission head respectively create projections on the ground;
  a photographic device disposed at a bottom portion of the airframe of the rotorcraft, wherein the photographic device is configured to photograph a landing target image and a distance image of the projections; and
  a controller configured to read and analyze the landing target image and the distance image so as to obtain real-time image data, identify a landing target pattern according to the real-time image data corresponding to the landing target image, obtain a spatial distance between a current position of the rotorcraft and the landing target pattern according to the predetermined angle and the real-time image data corresponding to the landing target image and the distance image, and control the electronic governor according to the spatial distance so as to make the rotorcraft land on the landing target pattern.

15. A automatic landing method of a rotorcraft, wherein the rotorcraft includes an automatic landing system of the rotorcraft comprising a motor configured to drive a propeller of the rotorcraft to rotate, an electronic governor communicatively connected with the motor and configured to regulate a rotational speed of the motor, a laser emitter and a photographic device, wherein the photographic device is disposed at a bottom portion of the airframe of the rotorcraft, wherein the laser emitter has a first emission head and a second emission head, wherein the first emission head and the second emission head respectively emit laser beams symmetrically about a central axis of the airframe, wherein the central axis is perpendicular to a horizontal plane of the ground at the location of a landing pattern, wherein a predetermined angle is formed between each laser beam and the central axis, and wherein the laser beams emitted from the first emission head and the second emission head respectively create projections on the ground, wherein the method comprises steps:
  photographing a landing target image and a distance image of the projections by means of the photographic device;
  reading and analyzing the landing target image and the distance image so as to obtain real-time image data,
  identifying a landing target pattern according to the real-time image data corresponding to the landing target image,
  obtaining a spatial distance between a current position of the rotorcraft and the landing target pattern according to the predetermined angle and the real-time image data corresponding to the landing target image and the distance image; and
  controlling the electronic governor according to the spatial distance so as to control a rotational speed of the motor to make the rotorcraft land on the landing target pattern.

16. The automatic landing method according to claim 15, wherein the spatial distance comprises an elevation of the rotorcraft and a plane coordinate of the rotorcratt with respect to the landing target pattern,
  wherein the elevation of the rotorcraft is calculated out according to the predetermined angle and the real-time image data corresponding to the distance image, and
  wherein the plane coordinate of the rotorcraft with respect to the landing target pattern is calculated out according to the real-time image data corresponding to the landing target image and the distance image.

17. The automatic landing method according to claim 16, wherein when the landing target pattern is identified according to the real-time image data corresponding to the landing target image,
  maintaining a current elevation of the rotorcraft unchanged by controlling the electronic governor;
  controlling the rotorcraft to move to a position right above the landing target pattern by controlling the electronic governor according to the plane coordinate of the rotorcraft with respect to the landing target pattern while maintaining a current elevation of the rotorcraft;
  when the rotorcraft is positioned right above the landing target pattern, controlling the rotorcraft to land on the landing target pattern by controlling the electronic governor according to the current elevation of the rotorcraft.

18. The automatic landing method according to claim 17, wherein the predetermined angle is configured to be an acute angle.

19. The automatic landing method according to claim 16, wherein the predetermined angle is configured to be an acute angle.

20. The automatic landing method according to claim 15, wherein the predetermined angle is configured to be an acute angle.

* * * * *